US005236766A

United States Patent [19]

Cole

[11] Patent Number: 5,236,766

[45] Date of Patent: Aug. 17, 1993

[54] FILE FOLDER EDGE REINFORCEMENT

[76] Inventor: Mary Cole, 342 Rimilton Avenue, Toronto, Ontario, Canada, M8W 2E6

[21] Appl. No.: 755,178

[22] Filed: Sep. 5, 1991

[30] Foreign Application Priority Data

Oct. 16, 1990 [CA] Canada ................................ 2027774

[51] Int. Cl.[5] ................................ B32B 3/04

[52] U.S. Cl. ................................ 428/194; 428/192; 428/220; 428/203; 40/27; 40/626; 40/641; 40/661

[58] Field of Search ................................ 428/40, 41, 42, 43, 428/192, 220, 194, 203, 204; 40/641, 626, 661, 27

[56] References Cited

U.S. PATENT DOCUMENTS

| | | | |
|---|---|---|---|
| 1,848,098 | 3/1932 | Aigner | 40/641 |
| 2,893,144 | 7/1959 | Cunningham | 40/641 |
| 3,054,202 | 9/1962 | Scholfield | 40/641 |

*Primary Examiner*—Alexander S. Thomas

[57] ABSTRACT

A file folder edge reinforcement for the free edge of a file and having, and elongated reinforcement panel of flexible polyester film to overly the front and back sides of a free edge of the file, notches formed in the ends of the panel, an adhesive layer on the undersurface of the panel, an adhesive barrier backing panel releasably secured to the undersurface of the reinforcement panel, a fold line defined by an axis between the notches, along which the panel can be folded to overly both the front and back of the free edge of the file.

6 Claims, 2 Drawing Sheets

FILE FOLDER EDGE REINFORCEMENT

FIELD OF THE INVENTION

The invention relates to a file folder edge reinforcement for reinforcing an edge of a file folder carrying information.

BACKGROUND OF THE INVENTION

File folders for storing documents and the like are usually made of a paper based material usually a relatively thin type of cardboard material. They are usually made with for example a front page and a back page joined at a fold. Usually the back page will be extended upwardly above the height of the back page. In some cases it is extended upwardly above the front page for the whole width of the page, and in other cases only a portion of the back page is extended upwardly in the form of a tab. This upper extension of back page is used for carrying information such as the name and the address of an individual, the subject matter of contents of the file, a numerical file index number, or an alphanumeric number or the like, by means of which the file may be identified.

Such files when stored away in filing cabinets or drawers or shelving systems, are then located and removed as desired, by reference to the information carried on to the extension of the back page.

In some filing systems, the extension portion of the file is to one side of the file instead of on the upper edge where for example the file that would be stored on shelves. This facilitates the filing away, and locating and pulling of file.

A great variety of such filing systems are known, and it is well known that in a busy office, such files may be pulled, used, additional documents stored, and the files refiled many times during the lifetime of the file. During the useful life of a file, it is well known that the edge extension portion of the file carrying the information will be flexed to and fro, and bent, and will be progressively damaged and worn away. The information carried on such files will become more and more difficult to read, thereby slowing down the filing of, and pulling of such files. In fact, it is well known that in many offices, it is necessary to make up entirely new file folder from time to time, and simply throw away the old ones as they become too worn for further use.

For all these reasons, it is clearly desirable to provide some form of reinforcement for the edges of the files, so that they may be made more resistant to wear and tear, and so that the useful life may be prolonged.

BRIEF SUMMARY OF THE INVENTION

With a view to overcoming various problems noted above, the invention comprises in combination with a file folder having front and rear panels, an index portion on at least one of said front and rear panels, said index portion defining front and rear sides, and a free edge, a reinforcement for folding over said free edge and for overlying and attachment to front and rear sides of said index portion, said reinforcement and comprising, an elongated reinforcement panel of flexible polyester film material defining first and second side edges, parallel to one another and respective front and rear end edge portions normal to said side edges, and an outer surface and an under surface, a front reinforcement panel portion defined by said first side edge and front end edge portions of said reinforcement panel, and adapted to overlie said front side of said of said index portion, a rear reinforcement panel portion defined by said second side edge and said rear end edge portions of said reinforcement panel and adapted to overlie said index portion of said file folder page, first and second notch means formed in respective ends of said reinforcement panel and defining said first and second end edge portions and a fold line between said front and said rear panel portions of said reinforcement panel, adhesive means on said undersurface of respective front and rear portions of said reinforcement panel adapted to bond to respective front and rear sides of said index portion of said file folder, with said fold line engaging said free edge of said index portion and with said notches substantially registering with said free edge of said index portion, and, an adhesive barrier backing panel releasably secured to said undersurface of said reinforcement panel, said backing panel means defining manually engageable edge means whereby the same may be manually engaged and peeled away from said undersurface of said reinforcement panel.

The invention further comprises such a reinforcement, wherein the polyester film material has a thickness t equal to between about 0.001 inches and about 0.002 inches, and wherein said barrier panel has a thickness T equal to between about 0.002 inches and about 0.004 of an inch.

The invention further comprises such a reinforcement as described, and wherein the backing panel is formed with an incision intermediate the ends of the reinforcement panel whereby the same may readily be peeled away.

The invention further comprises such a reinforcement wherein the backing panel includes an incision formed axially, from said end edge to the other of said reinforcement, and coincides with said notch means formed therein.

The invention further comprises a reinforcement, wherein the backing panel is a continuous elongated strip, and wherein said polyester panels are secured thereon, with spaces between adjacent end edges thereof, and including perforations formed through said backing panel means in said space between said end edges of said reinforcement panels.

The invention further comprises a reinforcement panel wherein the backing panel comprises a page defining length and width, and wherein said reinforcement panels are secured at spaced intervals transversely on said backing panel page, substantially parallel to the upper and lower end edges thereof and terminating short of the opposed side edges thereof.

The invention further comprises a reinforcement, wherein the polyester film material is transparent.

The invention further comprises a edge reinforcement wherein the polyester material is translucent, and is tinted a predetermined colour.

The invention further comprises a edge reinforcement wherein the polyester panel is an opaque material, adapted to receive typed information thereon.

The various features of novelty which characterise the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF A SPECIFIC EMBODIMENT

Figure 1:
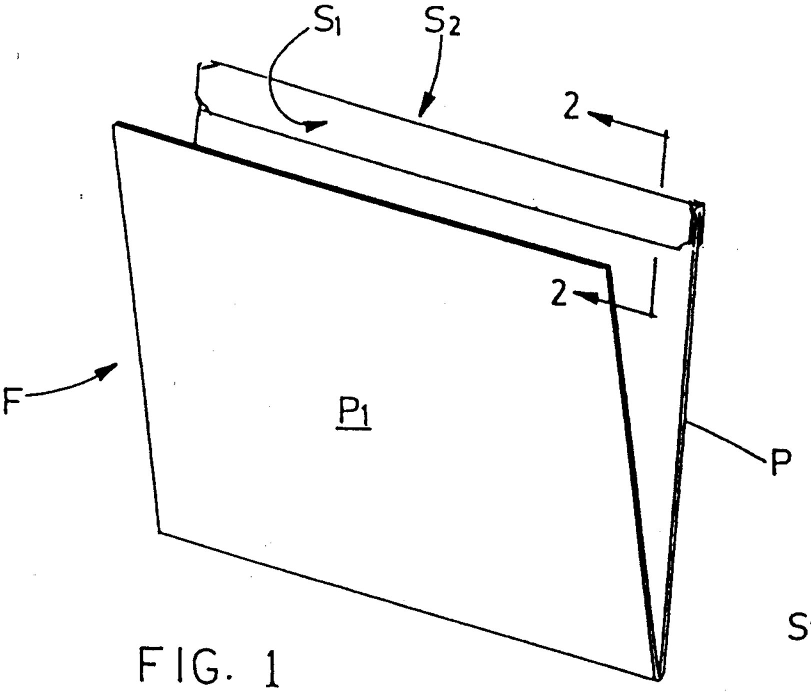
FIG. 1 is a perspective illustration of a typical file folder, showing an edge reinforcement thereon.

Referring first to FIG. 1, there is shown in that figure a typical file folder illustrated as F. Various different forms of document files are known some of them having front and back pages or panels P1 and P2, and others having three or more pages (not illustrated).

As is well known, in the great majority of such file folders F, the upper edge of the rear page or panel P2 is extended somewhat above the edge of the front page P1. This may be extended all the way along the length of the file, or may be extended part way along in the form of a tab.

It will also be appreciated that other forms of file folders are known in which one side edge of the file is extended beyond the other, so as to be visible along the side edge of an open sided filing drawer system Such different forms of file folders are however so well known in the art that only the simplest form of folder F is illustrated here.

In the great majority of offices, such file folders F are identified by means of information placed along the extending edge or tab usually the upper front surface S1 of the upper edge of the rear page P2. Usually, the information on the upper front surface S1 of page P2 is used for identifing the file and also for the purposes of locating its unique position in a filing system. This information may consist of the name and address of an individual, or a description of the subject matter or a key word for example, or in the great majority of cases will consist of a unique numerical file numbering system, or an alpha numeric numbering system, which is imprinted, stamped or typed or even in some cases hand written on that portion of the file.

When filed in a filing draw, the upstanding portion of the rear page P2 of the file folder F is thus readily visible, and a person looking for a particular file could simply look at the identifying information on the front surface S1 of the rear page P2, to locate the correct file.

As is also well known in office practice, when such files are repeatedly pulled out, used and refiled, the entire file folder F suffers from wear and tear. However, the greatest wear usually occurs along the upper edge of the rear page P2, so that the information shown on that rear page becomes progressively harder and harder to read. In many cases it becomes simply torn off and lost all together.

In many offices it is not uncommon to either be obliged to make makeshift repairs to files or to simply make up entirely new files to contain the papers and throw away the old worn file folder.

The invention is therefore directed to providing a file folder edge reinforcement for protecting and reinforcing the upper edge of a file folder F, so that it is both reinforced and protected, and at the same time, the information contained thereon is protected from damage, and is therefore rendered legible and useable for a much greater length of time.

Figure 2:
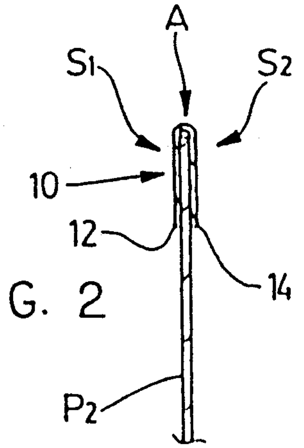
FIG. 2 is a section along the line 2—2 of FIG. 1.
Figure 3:
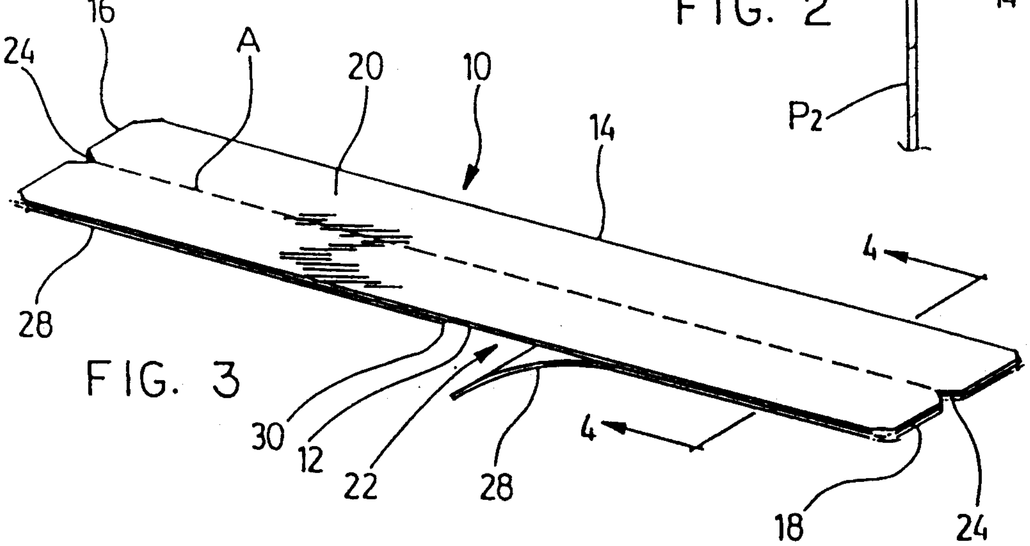
FIG. 3 is a perspective illustration of a edge reinforcement in accordance with the invention.
Figure 4:
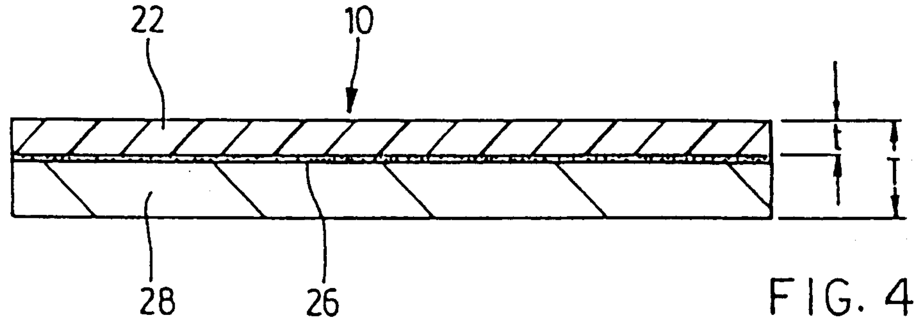
FIG. 4 is section along the line 4—4 of FIG. 3.

Turning now to FIGS. 2, 3, and 4, the invention will be seem to comprise an elongated retangular panel of polyester film material indicated as 10. Such polyester film material is typically available under the Trade Mark "Mylar", although the invention is not specifically limited to this particular make of polyester film.

The polyester film panel 10 defines front and rear side edges 12 and 14 and end edges 16 and 18.

The panel 10 defines an outer surface 20, and an undersurface 22. Notches 24–24 are formed in end edges 16 and 18, intermediate side edges 12 and 14, and lying on a common axis indicated as A in FIG. 3 defining a fold line along which the reinforcement may be folded.

An adhesive layer (FIG. 4) 26 is located on the undersurface 22 of panel 10, suitable for bonding to the paper material forming the file folder F.

In order to protect such adhesive layer 26, peelable backing panel means 28 are adhesively and releasably secured to the layer 26 . The panel means 28 is typically formed with an adhesive resistant coating i.e. a wax coating such as is well known in the art, by means of which secured temporarily on the adhesive layer 26, but is readily peeled away from such layer, leaving the adhesive intact on the under surface 22 of the panel 10.

In order to facilitate such peeling, in the embodiment of FIG. 3, an incision 30 is formed transversely of the central axis A through the backing panel mean 28. The incision 30 permits the panel 10 to be flexed transversely in the region of the incision, thus permitting the backing panel portions 28, 28 to be peeled away.

As will be noted from FIG. 4, the reinforcement panel 10 has a thickness t, and the peelable protective backing means 28 has a thickness T, wherein T is greater than t. Preferably, the relationship will be approximately as follows:

t equals between 0.001 and about 0.002 of an inch;

T equals between about 0.002 and about 0.004 of an inch, i.e. in the region of 1:4 to 1:1.

Preferably, the backing panel means 28 will consist of a paper material, usually having a stiffness somewhat greater than that of the polyester material of the panel 10. Thus when the polyester panel 10 is flexed at the incision 30 the backing panel means 28 will separate from the underside 22 of the panel 10 thereby permitting the same to be peeled away.

In operation, the file folder F will typically be first of all marked with suitable information either alphabetical, numerical or alpha numeric or any other information desired in any particular filing system, which may be either typed, rubber stamped, hand written, printed or otherwise. This marking may be e.g. handwritten, typed, or rubber stamped directly on the edge of the file, or may be typed on a separate adhesive label (not shown), and pasted on the file.

The reinforcement 10 is then prepared by peeling away the two backing panel means 28-28. It is then placed with the notches 24–24 and the axis A aligned along the top edge of the page P2 of the file folder F. The panel 10 is then folded over the surface S1 and over the surface S2 as shown in FIG. 2 thereby protecting both sides of the upper edge of the file folder page P2.

Typically, the polyester material from which panel 10 is made will be transparent. The information on the file is thus visible through the reinforcement. However, there may be circumstances where it is desirable to provide some degree of colour coding in a filing system. In this case, the polyester material can be tinted with a variety of different tints such as are available on the market, and still be substantially transparent or at least translucent. In this way, colour coded reinforcement panels 10 can be used for different files in the same filing system, and yet the information on the surface S1 of the page P2 will still be legible through the colour tinted reinforcement panel 10.

If, for some reason, the information requires revision, correction fluid may be painted over the reinforcement panel as needed, and fresh information typed.

Figure 5:
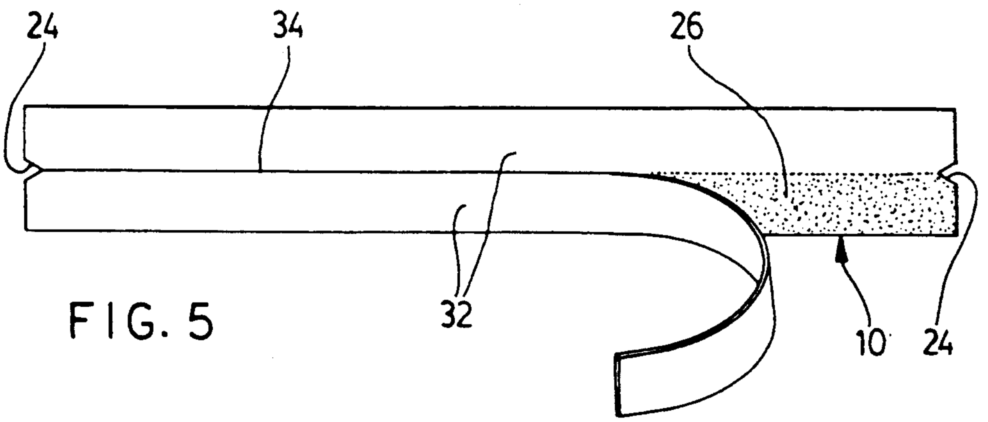
FIG. 5 is a lower plan view of an alternate embodiment of the invention, showing a portion of the backing panel partially peeled away.

In a further embodiment of the invention as illustrated in FIG. 5, the panel 10 is there illustrated, with backing panel means 32, 32 separated by an incision 34. The incision 34 runs along the central axis A of the panel 10. In the operation of this embodiment, it is possible to peel away one only of the two panels 32, and to position the exposed adhesive 26 of one half of the panel 10 over for example the front surface S1 of page P2 and secure it in position. The second backing panel 32 can then peeled away, and the panel 10 can then be folded over along the axis A over the surface S2.

Figure 6:
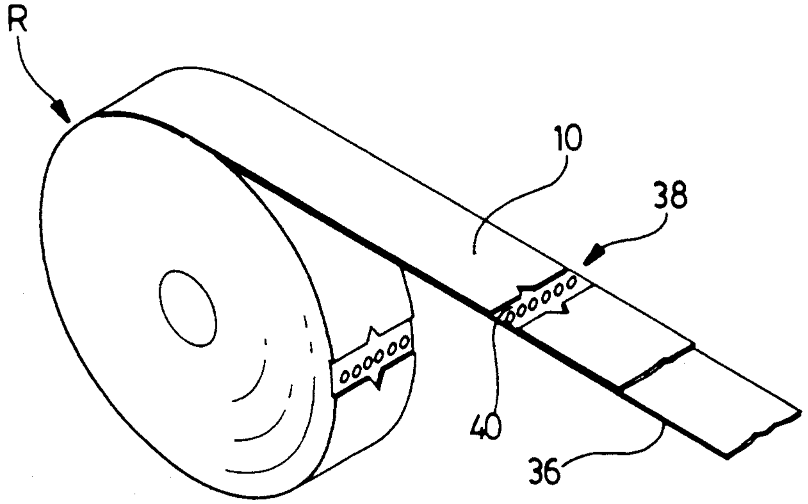
FIG. 6 is perspective illustration of an alternate embodiment of the invention, and, FIG. 7 is a plan view of a further alternate embodiment of the invention.

A further embodiment of the invention is illustrated in FIG. 6. In this embodiment, panels 10 are secured to a continuous strip 36 of backing panel means formed into a roll R. The reinforcement panels 10 will seen to have been separated by gaps 38. Perforations 40 may be formed, if desired, through the backing panel in the gaps 38. In this way, when it is desired to use a panel 10, it is first torn off the roll R along the perforations 40. The exposed portion of the backing panel means 36, adjacent the gap 38 can then be simply peeled away from the reinforcement 10 and the reinforcement applied in the manner described above.

Such perforations could be omitted if not required. In this case also, the incision on the backing panel can be omitted altogether.

Polyester film material of this type is available both in clear transparent form and tinted transparent or translucent form and is also available in an opaque white or coloured form. In this form, it will in fact receive typed information on the surface of the polyester itself. In these cases, it is possible to make up file labels which are themselves formed of polyester film, and also carry the information. This will produce a saving in time for labelling files where this is likely to present a considerable burden.

Figure 7:
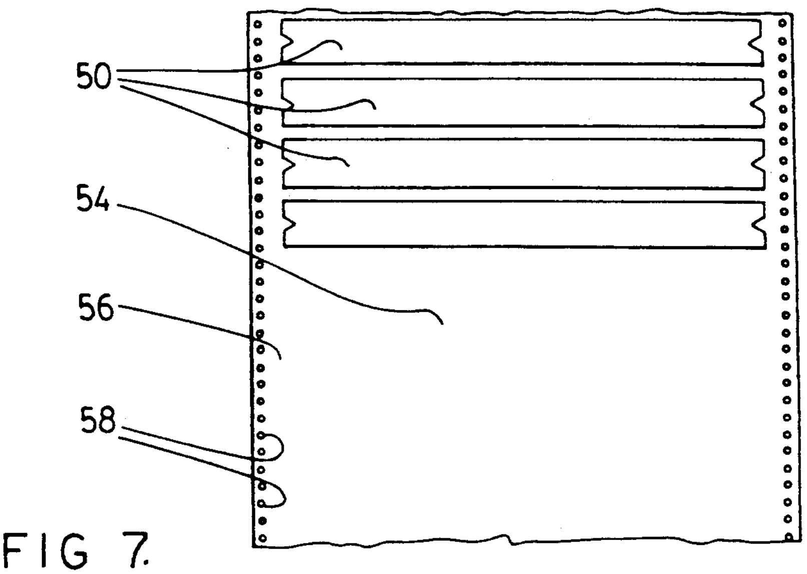

Thus, in this case, as for example as shown in FIG. 7, a plurality of reinforcement panels indicated generally as 50 may be formed of opaque polyester material suitable for receiving typed information. Such panels 50 maybe located on a continuous sheet, or on several such sheets of backing sheet material 52. In this case backing sheet material 52 is provided, having margins 54 with perforations 56. This enables such material to be used in a tractor feed printing device such as is used in association with computer installations. However, such material could equally well be used in a typewriter, with or without such perforations. Again, in the FIG. 7 embodiment, there is no incision in the backing panel.

The panels 50, which in this case provide both a protection for the edge of the page and also the label for carrying the information, are shown spaced apart from one another. In this way the information may be typed on them as desired, and each one peeled away as required for application to a particular file folder.

The foregoing is a description of a preferred embodiment of the invention which is given here by way of example only. The invention is not to be taken a limited to any of the specific features as described, but comprehends all such variations thereof as come within the scope of the appended claims.

What is claimed is:

1. An edge reinforcement on a file folder having:

front and rear panels;

an index portion on at least one of said front and rear panels, said index portion defining front and rear sides, and a free edge, said reinforcement comprising:

an elongated reinforcement panel of flexible polyester film material defining first and second side edges, parallel to one another and respective front and rear end edge portions normal to said side edges, and an outer surface and undersurface;

a front reinforcement panel portion defined by said first side edge and said front end edge portions of said reinforcement panel and overlying said front side of said index portion of said file folder;

a rear reinforcement panel portion defined by said second side edge and said rear end edge portions of said reinforcement panel and overlying said rear side of said index portion of said file folder;

first and second notch means formed in respective ends of said reinforcement panel and defining said first and second end edge potions and a fold line between said front and said rear panel portions of said reinforcement panel, and;

adhesive means on said undersurface of respective front and rear portions of said reinforcement panel and bonded to respective front and rear sides of said index portion of said file folder, with said fold line engaging said free edge of said index portion.

2. An edge reinforcement on a file folder as claimed in claim 1 wherein said polyester film material has a thickness t equal to between about 0.001 inches and about 0.002 inches.

3. An edge reinforcement on a file folder as claimed in claim 1 wherein said polyester film material is transparent.

4. An edge reinforcement on a file folder as claimed in claim 1 wherein said polyester material is translucent, and is tinted a predetermined colour.

5. An edge reinforcement on a file folder as claimed in claim 1 wherein said polyester panel is opaque material, adapted to receive typed information thereon.

6. A file folder comprising:

front and rear panels;

an index portion on at least one of said front and rear panels, said index portion defining front and rear sides, and a free edge;

an elongated reinforcement panel of flexible polyester film material defining first and second side edges, parallel to one another, and respective front and rear end edge portions normal to said side edges, and an outer surface and undersurface;

a front reinforcement panel portion defined by said first side edge and said front end edge portions of said reinforcement panel overlying said front side of said index portion of said file folder;

a rear reinforcement panel portion defined by said second side edge and said rear end edge portions overlying said rear side of said index portion;

first and second notch means formed in respective ends of said reinforcement panel and defining said first and second end edge portions and a fold line between said front and said rear reinforcement panel portions of said reinforcement panel, and, adhesive means on said undersurface of respective front and rear portions of said reinforcement panel bonded to respective front and rear sides of said index portion of said file folder, with said fold line engaging said free edge of said index portion and with said notch means substantially registering with said free edge of said index portion.

* * * * *